United States Patent
Rothschild

(10) Patent No.: US 10,852,038 B2
(45) Date of Patent: Dec. 1, 2020

(54) BONDING JUMPER CLIP FOR SOLAR PANELS

(71) Applicant: Elie Rothschild, San Francisco, CA (US)

(72) Inventor: Elie Rothschild, San Francisco, CA (US)

( * ) Notice: Subject to any disclaimer, the term of this patent is extended or adjusted under 35 U.S.C. 154(b) by 0 days.

(21) Appl. No.: 16/252,888

(22) Filed: Jan. 21, 2019

(65) Prior Publication Data

US 2019/0154306 A1    May 23, 2019

Related U.S. Application Data

(63) Continuation-in-part of application No. 15/097,684, filed on Apr. 13, 2016, now Pat. No. 10,187,004.

(51) Int. Cl.

| | |
|---|---|
| *F24S 25/20* | (2018.01) |
| *F24S 25/67* | (2018.01) |
| *F24S 25/63* | (2018.01) |
| *H02S 30/00* | (2014.01) |
| *H02S 30/10* | (2014.01) |
| *F24S 25/634* | (2018.01) |
| *F24S 25/60* | (2018.01) |

(52) U.S. Cl.
CPC ............ *F24S 25/634* (2018.05); *F24S 25/67* (2018.05); *H02S 30/00* (2013.01); *H02S 30/10* (2014.12); *F24S 25/20* (2018.05); *F24S 2025/6004* (2018.05)

(58) Field of Classification Search
CPC .......... F24S 25/634; F24S 25/67; F24S 25/20; F24S 2025/6004; H02S 30/10; H02S 30/00
See application file for complete search history.

(56) References Cited

U.S. PATENT DOCUMENTS

| | | | | |
|---|---|---|---|---|
| 5,451,167 A * | 9/1995 | Zielinski | ................ | H01R 4/245 439/435 |
| 6,276,947 B1 * | 8/2001 | Homfeldt | ................. | H01R 4/48 439/444 |
| 8,590,223 B2 * | 11/2013 | Kilgore | .................... | H01R 4/26 52/173.3 |
| 9,147,785 B2 * | 9/2015 | Haddock | ................. | F24S 25/67 |
| 9,608,559 B2 * | 3/2017 | Haddock | ................. | F24S 25/67 |
| 10,103,682 B2 * | 10/2018 | Haddock | ................. | H02S 20/00 |

(Continued)

*Primary Examiner* — Bayan Salone
(74) *Attorney, Agent, or Firm* — Mark David Torche; Patwrite Law

(57) ABSTRACT

A bonding jumper clip for electrically and mechanically joining two or more solar panel frames has a jumper portion with a first and second clip portion on opposably disposed on the outer edges of the jumper portion. The clip is made of one piece of metal and the clip portions have teeth that are punched, deformed and bent to form a selected clip geometry with a plurality of inwardly pointing teeth that penetrate through a protected surface of the solar panel frames, such as an anodized aluminum coating in order to electrically connect the frames together when the edges of the frames are inserted therein. A single ground is provided that it then electrically connected through the conductive frames to commonly ground the entire installation. The length of the jumper portion is selected to match the size of the frames being installed.

7 Claims, 4 Drawing Sheets

(56) References Cited

U.S. PATENT DOCUMENTS

2013/0048056 A1* 2/2013 Kilgore .................... H01R 4/26
                                                    136/251
2014/0261638 A1* 9/2014 Haddock ................. F24S 25/67
                                                    136/251
2016/0226433 A1* 8/2016 Haddock ................. F24S 25/67

* cited by examiner

BONDING JUMPER CLIP FOR SOLAR PANELS

CROSS REFERENCE TO RELATED APPLICATIONS

This application is a continuation in part of U.S. patent application Ser. No. 15/097,684, filed Apr. 13, 2016, the complete disclosure of which is hereby incorporated by reference.

BACKGROUND OF THE INVENTION

As alternative energy sources become more important to the economic and environmental well-being of society, solar energy use will continue to increase. It is becoming more common to see roofs and other structures having solar panels installed to generate electrical energy.

When installing arrays of solar panels, each panel must be grounded in order to operate safely and properly. In general, each panel it connected to ground using a clamp or grounding bolt that is attached to the solar panel frame. In this way each panel must be individually grounded. Because solar panel frames are treated to protect them from oxidation such as paints or other coatings, it is necessary to ensure that the grounding clamp makes a reliable electrical contact with the electrically conductive frame. This requires penetrating the protective coating in order to ensure that the panels are grounded.

There is a need for a reliable clip that easily allows the user to ground solar panel frames without having to individually attach a grounding clamp to each frame.

SUMMARY OF THE INVENTION

A bonding jumper clip for electrically and mechanically joining two or more solar panel frames has a jumper portion with a first and second clip portion on opposably disposed on the outer edges of the jumper portion. The clip is made of one piece of metal and the clip portions have teeth that are punched, deformed and bent to form a selected clip geometry with a plurality of inwardly pointing teeth that penetrate through a protected surface of the solar panel frames, such as an anodized aluminum coating in order to electrically connect the frames together when the edges of the frames are inserted therein. A single ground is provided that it then electrically connected through the conductive frames to commonly ground the entire installation. The length of the jumper portion is selected to match the size of the frames being installed.

Other features and advantages of the instant invention will become apparent from the following description of the invention which refers to the accompanying drawings.

DETAILED DESCRIPTION OF THE INVENTION

Figure 1:
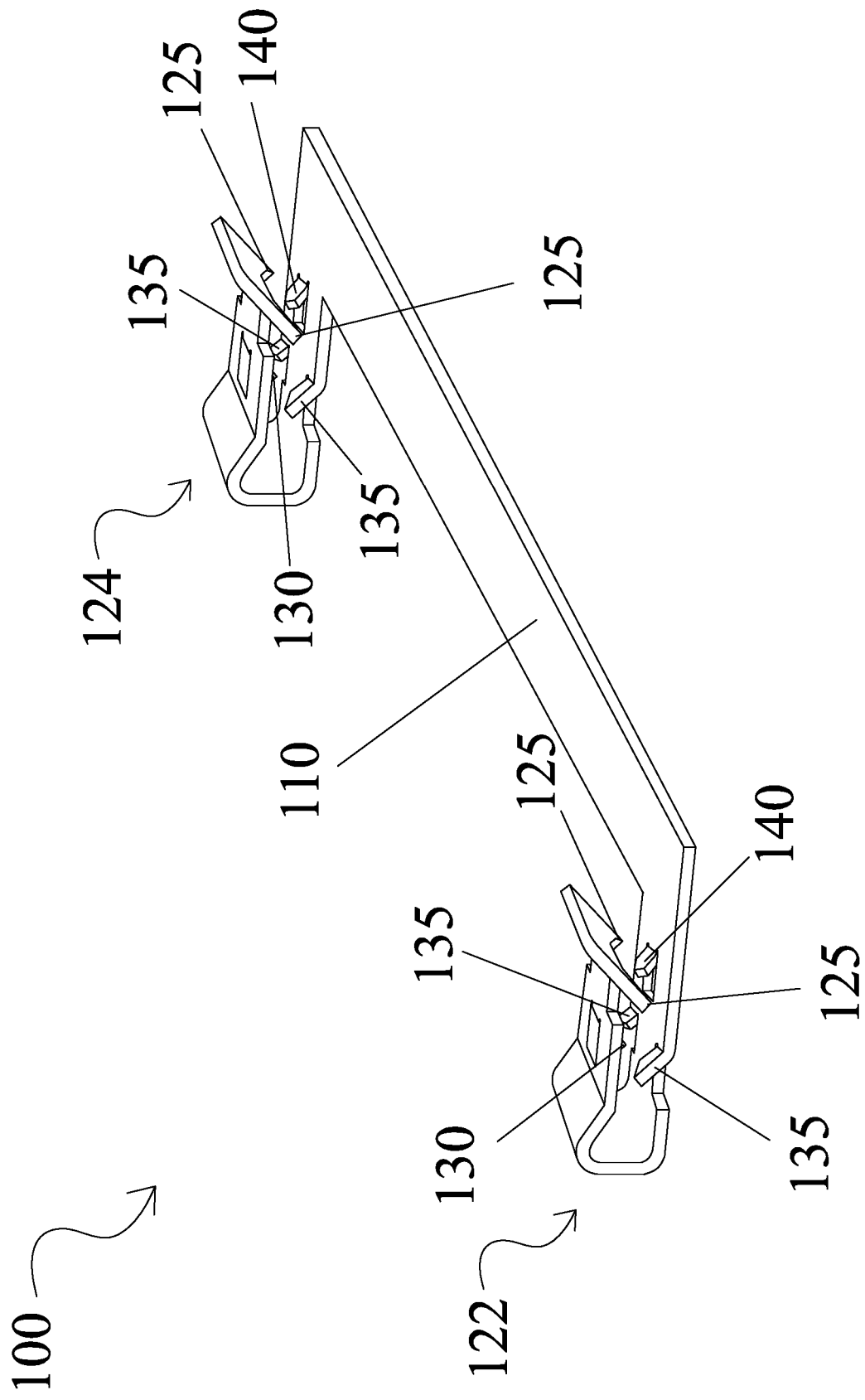
FIG. 1 is a perspective drawing of a bonding jumper clip according to an embodiment of the invention.
Figure 2:
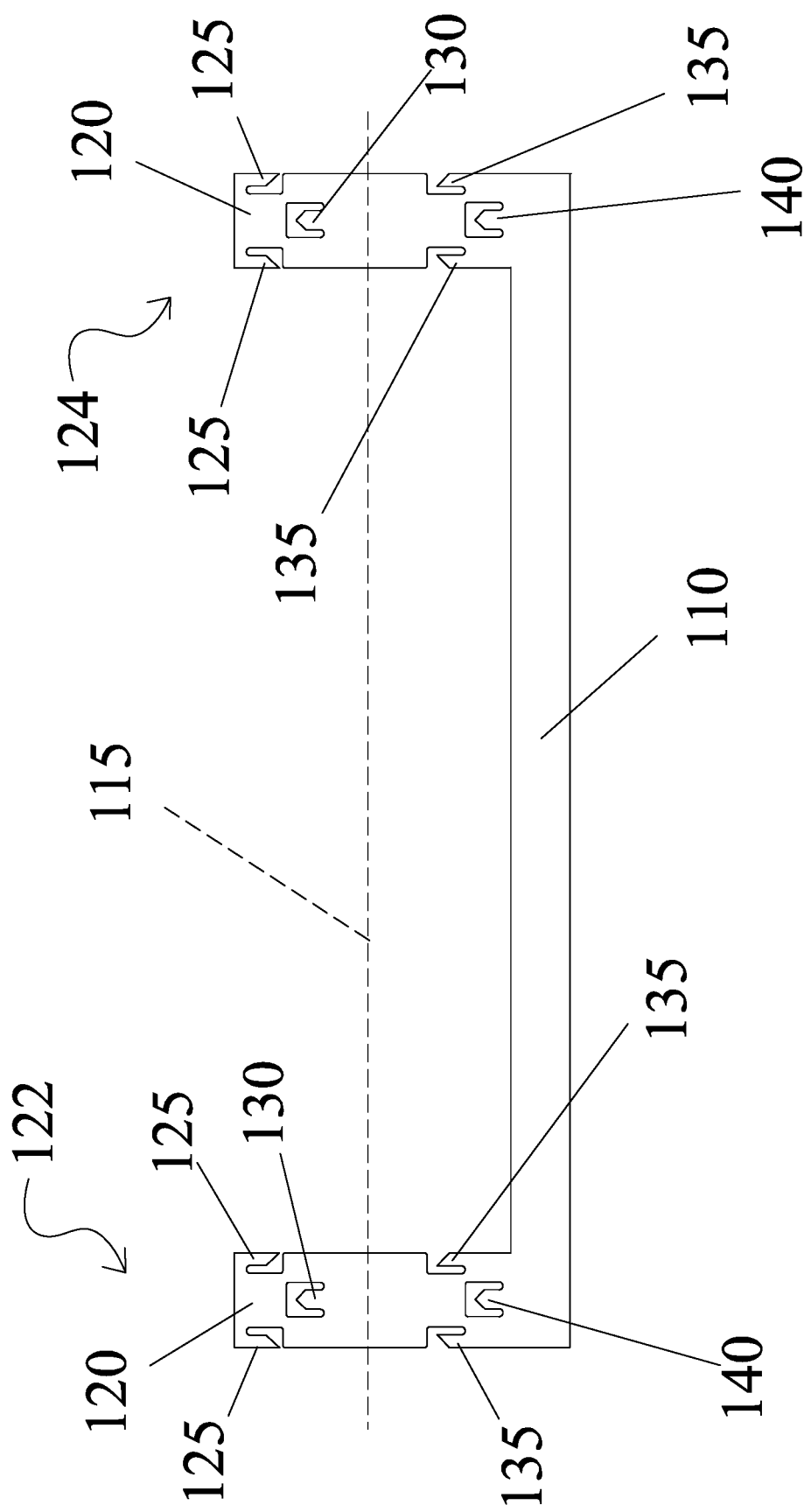
FIG. 2 is a top view of the bonding jumper clip shown in FIG. 1 before folding.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to the figures, a bonding jumper clip 100 is shown having a jumper portion 110 with clip portions 120 which has a first clip portion 122 and a second clip portion 124. Bonding jumper clip 100 is made from a single piece of electrically conductive material such as aluminum or steel. Each clip portion 120 has two upper outside teeth 125 and two lower outside teeth 135 opposably facing each other respectively. A centrally located upper inside tooth 130 and a lower inside tooth 140 also forms part of a plurality of locking teeth whereby a space is created that allows an inserted edge of a solar panel frame 145 to be firmly locked in place. Additionally, because the teeth 125, 130, 135 and 140 face each other, they penetrate the surface of solar panel frame 145 and thus allows the teeth to make electrical contact with solar panel frame 145 even if the frame is painted or otherwise coated to protect the frame. Anodized aluminum is often used in solar panel frames and the anodizing process produces an oxide layer that protects the frame from further oxidation but also electrically insulates the normally conductive aluminum. Of course other coatings are also used such as paint or plastic coatings. Almost all coatings also provide electrical insulation and the instant invention allows electrical connections to be made by the teeth penetrating through the coatings to the underlying aluminum.

Figure 3:
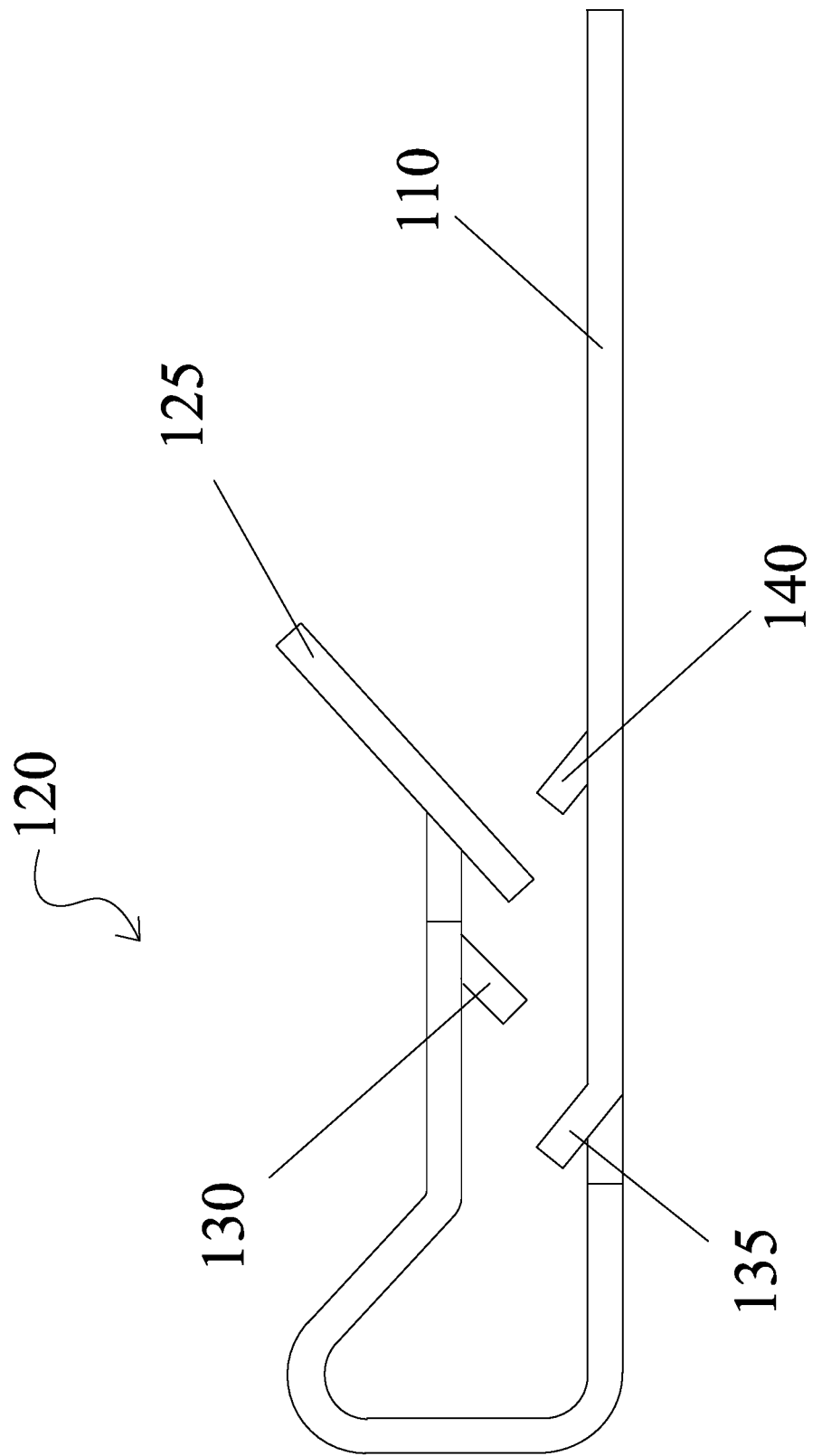
FIG. 3 is an end view of the bonding jumper clip shown in FIG. 1.
Figure 4:
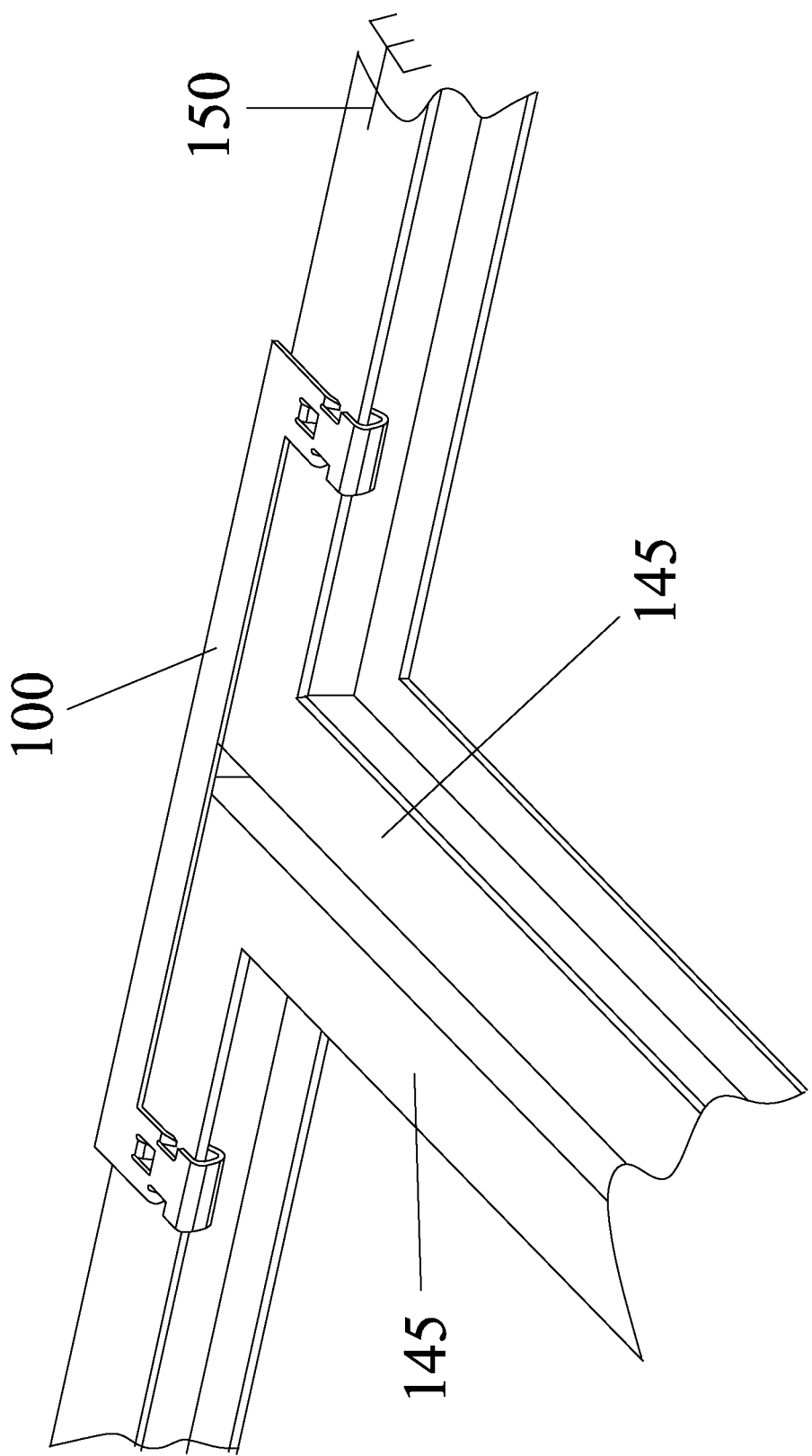
FIG. 4 is a perspective view of a bonding jumper clip attached to two solar panel frames.

The teeth (125, 130, 135 and 140 are punched and deformed to create the inwardly pointing teeth. The punching and bending is produced using dies and jigs as is known in the art. A bending line 115 is shown to illustrate a general folding direction, but the actual bending is generally bent using multiple fold lines to create a desired clip geometry as can be seen in FIG. 3 to create a resilient clip portion that locks a solar panel edge within and penetrates any coatings as described above.

Jumper portion 110 is long enough to electrically and mechanically join two solar panel frames 145 together regardless of the protective coatings. The length of jumper portion 110 can be selected to match the size of solar panel frames 145 selected. An electrical ground 150 is provided to allow any number of frames may be electrically joined together without the need to individually provide a separate of grounding clip on each frame.

Although the instant invention has been described in relation to particular embodiments thereof, many other variations and modifications and other uses will become apparent to those skilled in the art.

What is claimed is:

1. A bonding jumper clip for solar panel installation comprising:
    a jumper portion;
    said jumper portion being essentially oriented in a plane;
    said jumper portion having a selected length;
    said jumper portion having an upper surface and a lower surface;
    said lower surface being flat;
    wherein said jumper portion lies flat against a top surface of a pair of adjacent solar panels;
    a first clip portion disposed on one end of said lower surface of said jumper portion;
    a second clip portion disposed on an other end of said lower surface of said jumper portion;

said first and second clip portion being essentially oriented along said plane;

each of said first clip portion and said second clip portion having a bent portion with reverse curve portion;

said reverse curve portion having a radius of at least 180 degrees wherein a resilient clamp portion is defined;

said reverse curve portion having a curve upper portion and a curve lower portion; and a plurality of inward facing locking teeth disposed on an upper interior surface and a lower interior surface of said reverse curve portion wherein said plurality of inward facing locking teeth lockingly hold a frame portion of said solar panels.

2. The bonding jumper clip for solar panel installation according to claim 1 wherein said plurality of inward facing locking teeth are integrally formed therein.

3. The bonding jumper clip for solar panel installation according to claim 2 wherein said plurality of inward facing locking teeth are oriented in a direction opposite from said jumper portion.

4. The bonding jumper clip for solar panel installation according to claim 1 wherein said bonding jumper clip is made of an electrically conductive material.

5. The bonding jumper clip for solar panel installation according to claim 4 where said electrically conductive material is aluminum.

6. The bonding jumper clip for solar panel installation according to claim 4 where said electrically conductive material is steel.

7. A method of electrically grounding solar panel frames using a bonding jumper clip; the steps comprising:

obtaining a bonding jumper clip comprising;

a jumper portion;

said jumper portion being essentially oriented in a single plane;

said jumper portion having a selected length;

said jumper portion having an upper surface and a lower surface;

said lower surface being flat;

wherein said jumper portion lies flat against a top surface of a pair of adjacent solar panels;

a first clip portion disposed on one end of said lower surface of said jumper portion;

a second clip portion disposed on an other end of said lower surface of said jumper portion;

said first and second clip portion being essentially oriented along said plane;

each of said first clip portion and said second clip portion having a bent portion with reverse curve portion;

said reverse curve portion having a radius of at least 180 degrees wherein a resilient clamp portion is defined;

said reverse curve portion having a curve upper portion and a curve lower portion;

a plurality of inward facing locking teeth disposed on an upper interior surface and a lower interior surface of said reverse curve portion;

joining said solar panel frames by laying said lower surface flat against said solar panel frame; and inserting a first solar panel frame into said first clip portion; and inserting a second solar panel frame into said second clip portion wherein said plurality of inward facing teeth penetrate said first and said second solar panel frame whereby said first and said second clip portion is electrically connected to said first and said second solar panel frames; and grounding at least one of said solar panel frames to an electrical ground whereby each solar panel frame is electrically connected to ground through said bonding jumper clip.

\* \* \* \* \*